| United States Patent [19] | [11] 3,904,535 |
|---|---|
| Gordon et al. | [45] Sept. 9, 1975 |

[54] PHOSPHOSULFURIZED LUBRICATING OIL ADDITIVES

[75] Inventors: Chester D. Gordon, El Sobrante; Warren Lowe, El Cerrito; Bruce W. Hotten, Orinda, all of Calif.

[73] Assignee: Chevron Research Company, San Francisco, Calif.

[22] Filed: Nov. 19, 1973

[21] Appl. No.: 417,433

Related U.S. Application Data

[63] Continuation-in-part of Ser. No. 164,871, July 26, 1971, abandoned.

[52] U.S. Cl. ............................... 252/46.6; 260/139
[51] Int. Cl. ............................................. C10m 1/48
[58] Field of Search ..................................... 252/46.6

[56] References Cited
UNITED STATES PATENTS

| 3,135,729 | 6/1964 | Kluge et al. | 252/46.6 X |
| 3,257,318 | 6/1966 | Cohen et al. | 252/46.6 |
| 3,272,744 | 9/1966 | Schallenberg et al. | 252/46.6 |
| 3,364,185 | 1/1968 | Hoke | 252/46.6 X |

*Primary Examiner*—Helen M. S. Sneed
*Attorney, Agent, or Firm*—G. F. Magdeburger; C. J. Tonkin

[57] ABSTRACT

Lubricating oil additives having the properties of extreme pressure lubrication, stability and noncorrosivity towards copper are produced by phosphosulfurizing a mixture of $C_{10}$–$C_{20}$ olefin and high molecular weight polyolefin and neutralizing the product with alkanols and epoxides.

5 Claims, No Drawings

PHOSPHOSULFURIZED LUBRICATING OIL ADDITIVES

CROSS-REFERENCES TO RELATED APPLICATIONS

This is a continuation-in-part of application Ser. No. 164,871, filed July 26, 1971 and now abandoned.

BACKGROUND OF THE INVENTION

The process of phosphosulfurization consists of heating under suitable conditions in the presence of phosphorus sulfide. Unfortunately, the product so obtained may have disagreeable auxiliary properties such as a tendency to sludge, corrosiveness towards nonferrous metals, especially copper, incompatibility with other oil additives, turbidity, acidity, instability and a strong odor. The present invention provides a phosphosulfurized lubricating oil additive which is capable of imparting valuable oiliness properties, including high pressure, anti-wear and anti-friction properties, to lubricating oils and greases without rendering them corrosive towards nonferrous metals.

SUMMARY

Lubricating oil additives having the properties of extreme pressure lubrication, stability and noncorrosivity towards copper are produced by phosphosulfurizing a mixture of $C_{10}$–$C_{20}$ olefin and polyolefin of average molecular weight from about 800 to about 1,400, in a mol ratio of olefin to polyolefin of about 1–5:4–1, with phosphorous sulfide in a weight ratio of said mixture to phosphorous sulfide of about 1–10:1 at a temperature of about 100°–300°C for about 2–8 hours to form a first product; contacting said first product with a $C_{10}$–$C_{25}$ alkanol at about 140°–175°C for about 2–8 hours to form a second product; and contacting said second product with a $C_2$–$C_{25}$ epoxide at about 20°–100°C for about 0.1–4 hours. In a preferred process, said first product is partially hydrolyzed by contacting same with steam or water before contact is made with alkanol.

DETAILED DESCRIPTION OF PREFERRED EMBODIMENTS

The superior lubricating oil additives of the present invention are derived from a mixture of olefin and polyolefin which is phosphosulfurized by heating with a phosphorous sulfide. The phosphosulfurized material is esterified with a $C_{10}$–$C_5$ alkanol, or alternatively, it may be hydrolyzed before esterification. The product is found to be corrosive towards copper, apparently due to some residual acidity. Neutralization may then be effected by base, such as NaOH or KOH, or by metallic oxides. However, it was found that neutralization of the residual acidity by means of an epoxide produced a final product which is noncorrosive.

The olefin used in the present invention is a low molecular weight olefin of from about 10 to about 30 carbon atoms, preferably from about 10 to about 25 carbon atoms, and most preferably from about 10 to about 20 carbon atoms. The olefin is an ethylenically unsaturated hydrocarbon composed of carbon and hydrogen and free of aromatic or acetylenic unsaturation. Preferably, the olefin is an alpha-olefin and most preferably the olefin is obtained from the cracking of wax, i.e., "cracked-wax olefin". Examples of olefin include decene, undecene, pentadecene, tricosene, methyldodecene, undecadiene and pentadecadiene.

The polyolefin used in the present invention is a high molecular weight hydrocarbon composed of carbon and hydrogen and having a total molecular weight of from about 800 to about 3,000, preferably from about 800 to about 2,000 and most preferably from about 800 to about 1,400. The polyolefin is ethylenically unsaturated, containing from 1 to about 2 ethylenically unsaturated carbon bonds, and is free of acetylenic or aromatic unsaturation. The polyolefin is normally obtained from the polymerization of mono-olefins of from 2 to 6 carbon atoms with the proviso that ethylene is copolymerized with a higher homologue such as propylene. Illustrative polyolefin includes, polypropylene, $C_2$–$C_3$ copolymer, polyisobutylene, poly-1-butene and poly-1-hexene.

The mol ratio of olefin to polyolefin in the product of the present invention will normally vary from 1:4 to 5:1 and preferably from 1:1 to about 3:1.

The mixture of olefin and polyolefin in the above mol ratio is phosphosulfurized by contacting same with a phosphosulfurizing agent, preferably a phosphorous sulfide selected from the group consisting of phosphorous trisulfide, phosphorous sesquisulfide, phosphorous pentasulfide and phosphorous hexasulfide. Most preferably the phosphosulfurizing agent is $P_2S_5$, phosphorous pentasulfide. Phosphorous sulfide is normally used in a weight ratio of olefin-polyolefin mixture to phosphorous sulfide of about 1–10:1.

The olefin-polyolefin mixture is normally contacted with the phosphorous sulfide at a temperature of from about 100° to about 300°C, for about 1–10 hours, preferably at a temperature from about 100° to about 300°C for about 2–8 hours. Generally 3–15 weight percent sulfur and 0.5–10 percent phosphorous in the phosphosulfurized olefin-polyolefin mixture is desirable and preferably 5–10 percent sulfur and 3–7 percent phosphorous is preferred.

In a preferred embodiment of the present invention, the phosphosulfurized olefin-polyolefin mixture is partially hydrolyzed by treating with water or steam. The hydrolysis may be effected by contacting the product with up to about 10 weight percent of water based on the weight of the product, or preferably contacting the mixture with steam for a period of from 0.1 to 2 hours. In the next step, the phosphosulfurized olefin-polyolefin mixture is esterified by contacting same with a $C_1$–$C_{25}$, preferably a $C_{10}$–$C_{25}$, alkanol at a temperature of from about 140° to 175°C for a period of from about 2 to about 8 hours, preferably from about 2 to about 6 hours. The alkanol is normally a long-chain aliphatic alcohol such as dodecyl alcohol, octadecyl alcohol, tetradecyl alcohol, and hexadecyl alcohol. The alkanol is normally a mono-ol. In the preferred embodiment the mol ratio of olefin to $P_2S_5$ to alcohol is about 2–4:1:1.

In a final step, the product formed by the esterification of the olefin-polyolefin phosphosulfurized mixture is neutralized by contacting same with an epoxide at a temperature of from about 20° to about 100°C for a period of from about 0.1–4 hours, and preferably 1–4 hours. The epoxide is a $C_2$–$C_{25}$ alkyl epoxide and preferably is ethylene or propylene oxide. In the final step the pH of the product is increased to a final value of about 6–7 by contacting with epoxide. $C_2$–$C_{25}$ epoxide is normally prepared by the treatment of the corresponding $C_2$–$C_{25}$ alkene with a peroxy acid such as peroxyacetic acid.

The method of the present invention is illustrated in the following illustrative examples.

EXAMPLE 1

To a 2-liter flask is charged 222 grams of $P_2S_5$, 300 grams of $C_{15}$–$C_{20}$ alpha-olefin (about 2 moles) and 1000 grams (about one mole) of polyisobutylene having an average molecular weight of 950. The mixture is maintained at a temperature of about 200°C for 5 hours to form a phosphosulfurized olefin polyolefin mixture.

EXAMPLE 2

1300 grams of the product of Example 1 is contacted with 210 grams (about one mole) of mixed n-tetradecanol and n-pentadecanol at a temperature of 150°C for 4 hours. This product mixture is contacted with 300 grams of ethylene oxide at 25°C for 2 hours to obtain the final product.

EXAMPLE 3

1300 grams of the product of Example 1 is partially hydrolyzed by contacting same with 100 grams of water at about 90°–100°C for one hour. The product is then treated as in Example 2.

EXAMPLE 4

To a one-liter flask equipped with a sintered glass bubbler is charged 210 grams of the reaction product of a $C_{14}$–$C_{15}$ alkanol with the partially hydrolyzed reaction product of $P_2S_5$ with polyisobutylene of 950 average molecular weight and $C_{15}$–$C_{20}$ alpha-olefins. 19.8 grams of ethylene oxide is added by means of the sintered glass bubbler over a period of about 2 hours with the temperature varying from 72°–84°F (22°–29°C). The product is stripped under vacuum at 300°F (149°C).

Additive Medium

The products of this invention may be used singly or preferably in combinations of two or more in an oil of lubricating viscosity. The lubricating oil can be any relatively inert and stable fluid of lubricating viscosity. Such lubricating fluids generally have viscosities of 35–50,000 SUS at 100°F (38°C). The fluid medium or oil may be derived from either natural or synthetic sources. Included among the natural hydrocarbonaceous oils are paraffin-base, naphthenic-base or mixed-base oils. Synthetic oils include polymers of various olefins, generally of from 2 to 6 carbon atoms, alkylated aromatic hydrocarbons, etc. Nonhydrocarbon oils include polyalkylene oxide, aromatic ethers, silicones, etc. The preferred media are the hydrocarbonaceous media, both natural and synthetic. Preferred are those hydrocarbonaceous oils having viscosity of about 100–4,000 SUS and particularly those having viscosity in the range of from 200 to 2,000 SUS at 100°F.

The lubricating oil will be a major proportion of the composition and preferably will be at 75 or greater percent by weight of the final lubricant composition. In concentrates, however, the oil may be present as 10–75 percent by weight. These concentrates are diluted with additional oil prior to being placed in service to obtain the requisite concentration.

Other additives may also be present in the composition of this invention. While the preferred lubricating oil compositions of the present invention contain from 0.1 to about 15 percent by weight of the products of this invention, it is generally preferred that other materials be present for enhancing the EP effect of the additive, or providing other desirable properties to the lubricating medium. These include such additives as rust and corrosion inhibitors, antioxidants, detergents, foam inhibitors, anti-wear agents, viscosity index improvers, pour point depressants, etc. These will usually be in the range from about 0–5 percent by weight, more generally in the range of from about 0–2 percent by weight of the total composition. Typical additional additives found in compositions of the present invention include lead naphthenates, phenolic and arylamine antioxidants, zinc dihydrocarbyl dithiophosphates, rust inhibitors, such as the metal sulfonates, foam inhibitors, such as the polymethylsiloxanes, etc.

EVALUATION

The usefulness of an olefin-polyolefin mixture was discovered when it was found that the choice of polyolefin alone yields a final product with good extreme pressure properties and thermal stability, but having poor anti-friction properties; while the choice of a low molecular weight olefin alone yields a final product with good extreme pressure and anti-friction properties, but having poor thermal stability. Quite unpredictably, the combination of high molecular weight polyolefin with low molecular weight olefin gives a product having properties superior to either taken alone. This is illustrated in TABLE I.

TABLE I

| Additive[1] | Falex[2] EP | Stability[3] | $f_S$ | Godfrey Tribometer[4] $f_K$ | T |
|---|---|---|---|---|---|
| 3PB/$P_2S_5$[5] | 1230 | 10 | 0.21 | 0.17 | 40°C |
| PB/$P_2S_5$ | 1775 | — | — | — | — |
| 40/$P_2S_5$/ROH/E[6] | 1000 | 3–4 | 0.13 | 0.10 | 260°C |
| O/$P_2S_5$ | 2000 | — | — | — | — |
| PB/3O/$P_2S_5$/ROH/PrO[7] | 12000 | 5–7 | 0.17 | 0.11 | 260°C |
| PB/O/$P_2S_5$ | 1975 | 8 | — | — | — |

[1]Additive at 2% by weight in a 480 SUS ($V_{100}$) neutral oil.
[2]Load, in pounds, at failure.
[3]Days to appreciable sludge formation in the composition at 300°F (149°C).
[4]4.5% additive by weight in a solvent refined 126 SUS ($V_{100}$) neutral oil.
[5]Mole ratio of polybutene of 950 number average molecular weight to phosphorous pentasulfide.
[6]Mole ratio of $C_{15}$–$C_{18}$ olefin to phosphorus pentasulfide to $C_{12}$–$C_{15}$ alkanol to $C_{15}$–$C_{18}$ epoxide.
[7]Mole ratio of polybutene of 950 number average molecular weight to olefin to phosphorous pentasulfide to $C_{12}$–$C_{15}$ linear alcohol to propylene oxide.

Anti-friction properties of the product as a function of temperature are determined from tests conducted with the Godfrey Tribometer. The Godfrey Tribometer is described in *ASLE Transactions*, 7, pp. 24–31 (1964). In the present tests on that instrument, a loaded (1 kg) bearing ball slides at low speed against a rotating steel ring lubricated with test lubricant and held at known temperature. After a 1 hour break-in period at a sliding speed of 30 cm/sec, the speed is reduced to a severe boundary condition of 1 cm/sec and the temperature is steadily raised by an electric heater. The kinetic coefficient of friction, fK, and the static coefficient of friction, fS, are measured as well as the transition temperature, T, at which fK rises above 0.2. Base oil-lubricated specimens give coefficients of about 0.15–0.3. Satisfactory boundary lubrication is achieved when the coefficient is reduced below 0.15–0.20. The transition temperature should be high and is considered satisfactory if it is above 150°C.

The stability test is performed by heating a lubricating oil composition containing the product additive to about 150°F (65°C) and allowing it to stand at this temperature until a sludge or visible amounts of particulate reaction products are formed. Lead naphthenate will be present in the oil composition to about 3.6 percent by weight. To pass this test, the time before appreciable sludge formation should be on the order of 5 days. In a more severe stability test, a 2 percent by weight composition of the product additive in oil is held at 300°F (149°C). The additive passes this stability test if it fails to form an appreciable amount of sludge before about 4 days.

The results of TABLE II show the clear superiority of the olefin-polyolefin phosphosulfurized and neutralized reaction product of the present invention in their combination of Falex EP, stability and tribometric properties.

TABLE II

| Composition[1] | Copper Strip[2] | Stability[3] | 4-Ball[4] | Falex EP[5] |
|---|---|---|---|---|
| Base Oil[6] | 1a | — | 0.76 | 950 |
| SSWO[7] | 1a | 3–6 | 0.37 0.44 | 1400–1500 |
| 40/P$_2$S$_5$/ROH + 25% Epoxide[8] | 1a,b | 2–3 | 0.29 | 1200 |
| 40/P$_2$S$_5$/ROH + 6.4% Epoxide[8] | 2c | 3–4 | 0.31 | 1000 |
| 30/PB/P$_2$S$_5$/ROH + ethylene oxide[9] | 1a | 8–9 | 0.41 | 1500 |
| 30/PB/P$_2$S$_5$/ROH + propylene oxide[9] | 1a | 7 | 0.39 | 1200 |

[1]Composition is 2% additive by weight in base oil.
[2]Copper strip immersed in composition for 3 hours at 250°F, ASTM D-130.
[3]Days to appreciable sludge formation with composition at 300°F.
[4]Scar width in mm. in 4-Ball Test (20 kg., 1800 rpm, 1 hour).
[5]Load in pounds at failure.
[6]Solvent refined V$_{100}$=480 SUS neutral oil.
[7]Sulfurized sperm whale oil.
[8]Mole ratio of C$_{15}$–C$_{18}$ alpha-olefin to P$_2$S$_5$ and C$_{11}$–C$_{15}$ alcohol, plus percent by weight of C$_{15}$–C$_{18}$ epoxide.
[9]Mole ratio of C$_{15}$–C$_{18}$ alpha-olefin to polyisobutylene of average molecular weight 950 to P$_2$S$_5$ and C$_{11}$–C$_{15}$ alcohol, plus neutralization by epoxide.

What is claimed is:

1. A lubricating composition comprising a major amount of an oil of lubricating viscosity, and in an amount sufficient to impart EP properties to said lubricating composition, a lubricating oil additive produced by reacting a mixture of a C$_{10}$–C$_{20}$ olefin and polyolefin of average molecular weight of from about 800 to about 1,400 in a mol ratio of olefin to polyolefin of about 1–5:4–1, with phosphorous sulfide in a weight ratio of said mixture to phosphorous sulfide of about 1–10:1 at a temperature of about 100°–300°C for about 2–8 hours to form a first product;

contacting said first product with a C$_{10}$–C$_{25}$ alkanol at about 140°–175°C for about 2–8 hours to form a second product;

and contacting said second product with a C$_2$–C$_{25}$ epoxide at about 20°–100°C for about 0.1–4 hours.

2. A lubricating composition according to claim 1 wherein the polyolefin is polyisobutylene.

3. A lubricating composition according to claim 1 wherein the phosphorous sulfide is P$_2$S$_5$ and the mol ratio of olefin to phosphorous sulfide to alcohol is about 2–4:1:1.

4. A lubricating composition according to claim 1 wherein the epoxide is ethylene oxide or propylene oxide.

5. The lubricating composition of claim 1 wherein said first product is partially hydrolyzed by contacting with steam or water before contacting with alkanol.

* * * * *